Figure 1:
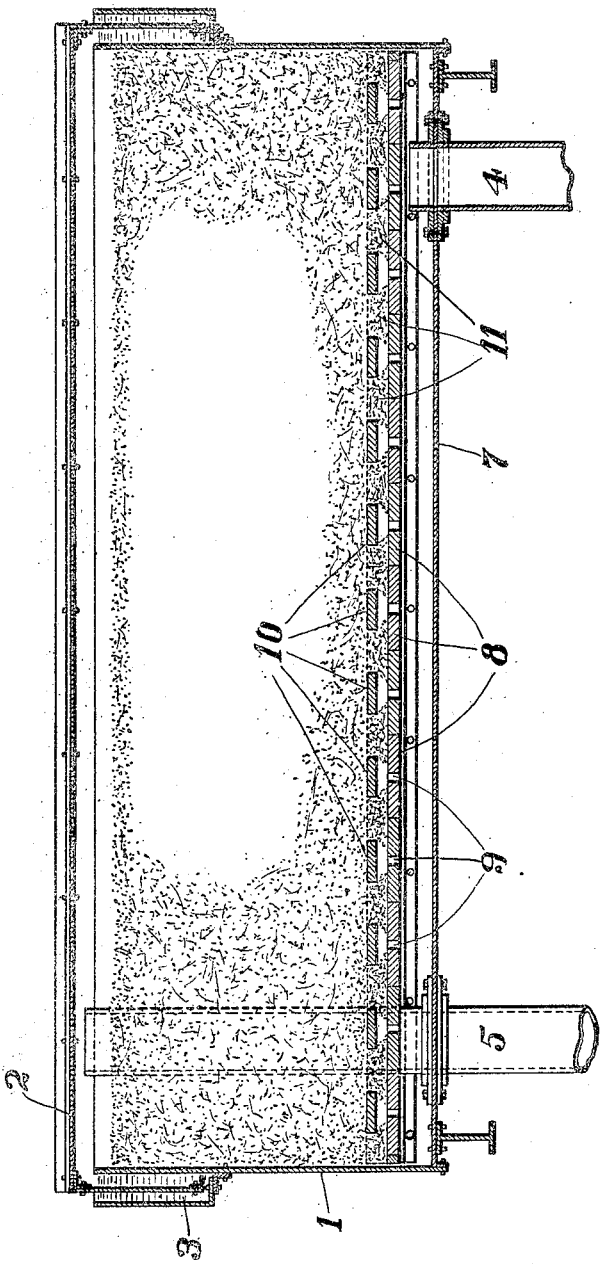

No. 878,128. PATENTED FEB. 4, 1908.
H. L. DOHERTY.
PURIFIER BOX.
APPLICATION FILED NOV. 12, 1906.

3 SHEETS—SHEET 2.

WITNESSES:

INVENTOR
Henry S. Doherty
BY
Marble & McElroy
ATTORNEYS

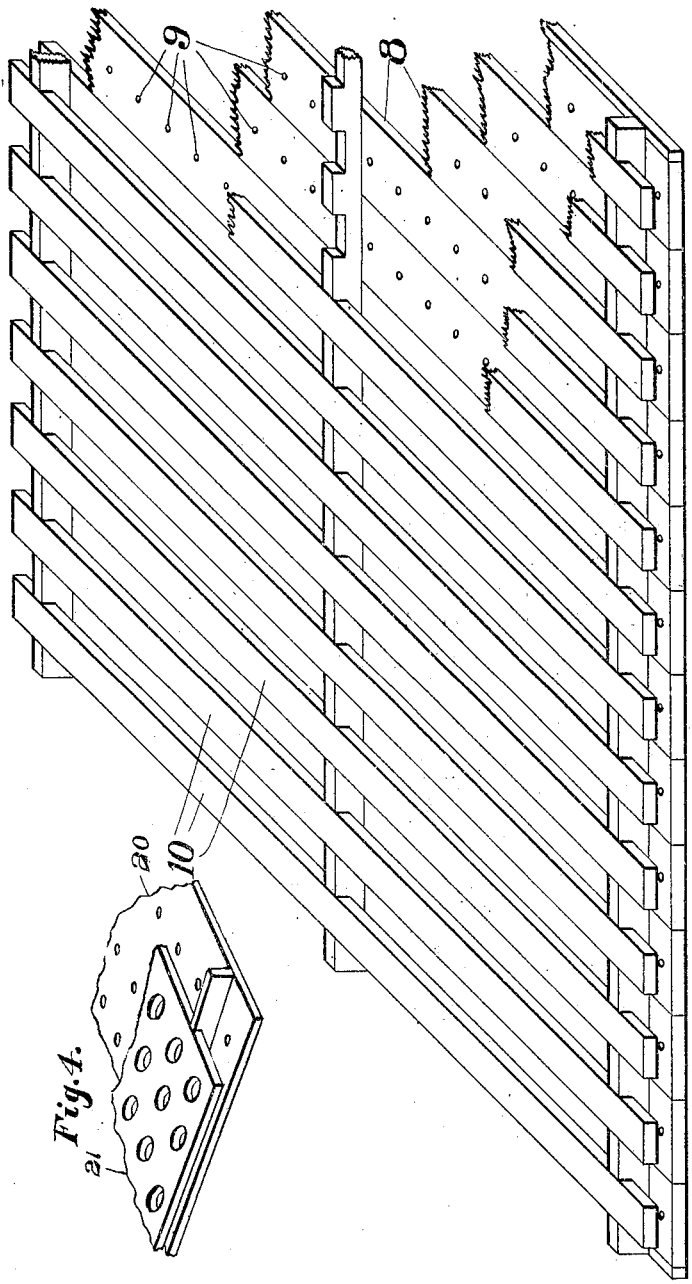

UNITED STATES PATENT OFFICE.

HENRY L. DOHERTY, OF MADISON, WISCONSIN.

PURIFIER-BOX.

No. 878,128.  Specification of Letters Patent.  Patented Feb. 4, 1908.

Application filed November 12, 1906. Serial No. 343,055.

*To all whom it may concern:*

Be it known that I, HENRY L. DOHERTY, a citizen of the United States, residing at Madison, in the county of Dane and State of Wisconsin, have invented certain new and useful Improvements in Purifiers; and I do hereby declare the following to be a full, clear, and exact description of the same, such as will enable others skilled in the art to which it appertains to make and use the same.

This invention relates primarily to gas distributing means for distributing gas with approximate uniformity through a mass of pulverulent or granular material, and is embodied specifically in a purifying box or vessel for treating gases with pulverulent or granular reagents, said box being adapted, by reason of my invention being applied thereto, to produce a maximum contact of gas and purifying material without clogging of gas conduits and with substantial uniformity of contact throughout the mass of such material; all as more fully hereinafter set forth and claimed.

Many reagents used for purifying gases are loose powders, such, for instance, as the iron oxid employed for removing sulfur from lighting gas, and it is a technically difficult problem to direct gases evenly and uniformly through a mass of such powder. Whether the gas be fed through from above, below or at one side, there are always orifices into which the powder can tumble and which it can clog, while if the endeavor be made to use a single well protected orifice in side or bottom, there is not the desirable even distribution of gas through the mass of the powder. If, as is frequently the case, even distribution and absence of clogging be sought by employing fabrics or gauze, of too fine a mesh for the entrance of powder, undue friction and slowness of passage of the gas are inevitable results. With the usual iron oxid, or iron salts, used for the stated purpose, it is customary for this reason to employ more or less sawdust, mixed with the purifying material, thus giving the mass a sort of fiber and enabling it to arch over inferior orifices. But this is not very satisfactory, and moreover the sawdust is not desirable as a component of such mixtures in many cases.

In the present invention, the desired object is secured by a simple, cheap and inexpensive structure, giving a maximum thoroughness of contact between gas and reagent without danger of clogging, or of localized distribution of gas currents through the mass of material.

I will now proceed to describe my invention with reference to the accompanying drawings, which illustrate a gas purifying box embodying the said invention.

Figure 2:
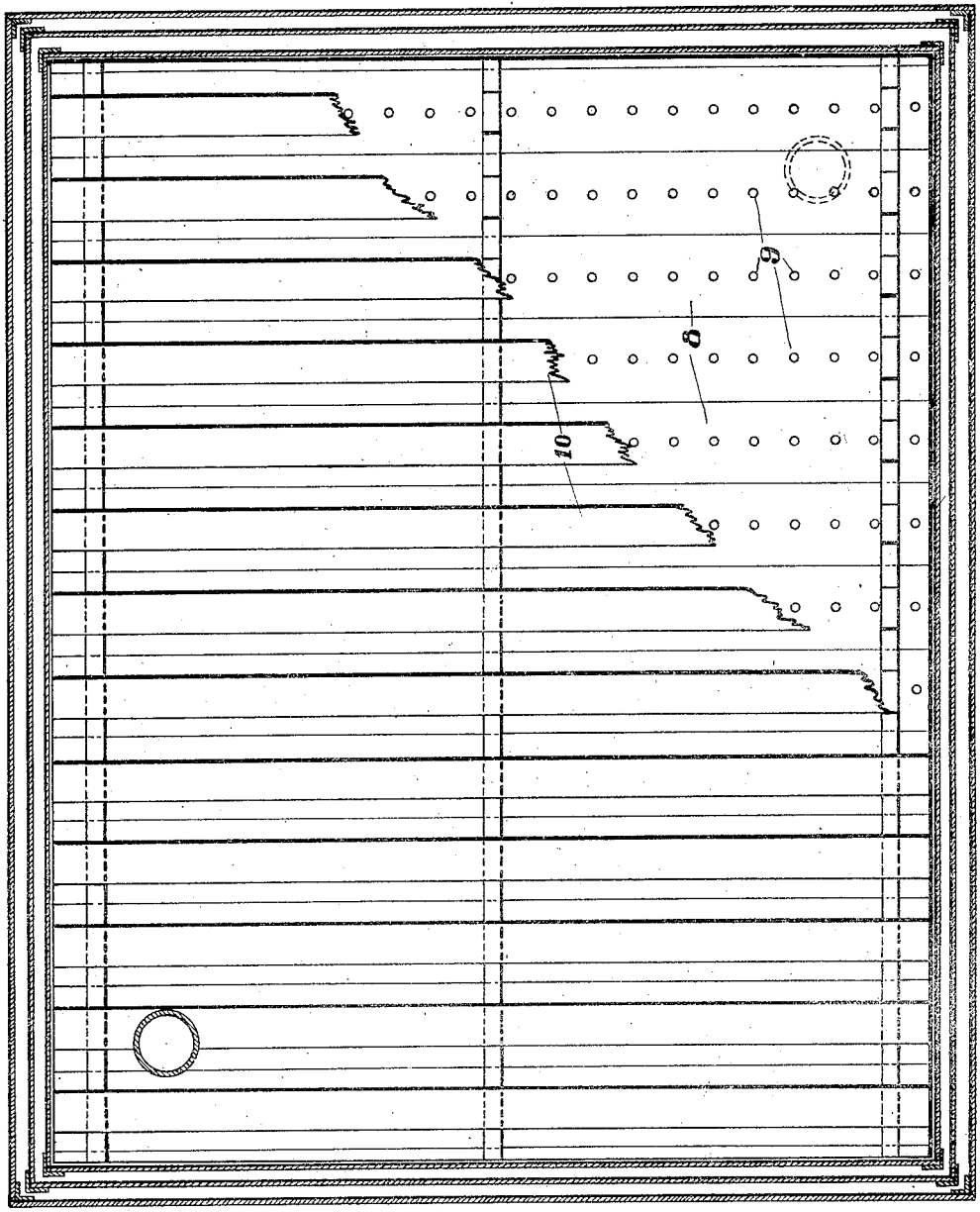

In the said drawings: Figure 1 shows a vertical longitudinal section through such a purifying box; Fig. 2 shows a top view of the box, empty, with the cover removed; and Fig. 3 shows an isometric perspective of the two bottoms; Fig. 4 is a detail fragmentary view of two continuous bottom plates, 20 and 21, shown broken away and also shown provided with staggered sets of orifices.

The essential feature of my invention is, the introduction of the gas into the pulverulent or granular material through a series of holes or open spaces in a perforated plate or equivalent form of a false bottom, said holes or open spaces being so spaced and distributed as to give the desired distribution, and in guarding these holes against entry of the pulverulent or granular material thereto, by a series of guards located between said holes and the main body of the material, and so spaced and of such width, that pulverulent material falling or passing therearound and assuming, as it will, an angle of repose upon such false bottom corresponding to the existing conditions, will not reach any of such holes.

In embodying this invention in a gas purifier, a closed purifier box of any desired shape, structure or material is provided with gas outlets and inlets adapted to direct a current of gas through it either from above downwards or from below upwards, the latter being generally deemed preferable. Near its base it is provided with two false bottoms, the upper being a series of slats or a diaphragm perforated with tolerably large holes, the said slats or the material between said holes, forming the guards or shields above mentioned. Below this is the second false bottom, a diaphragm or partition extending horizontally across the vessel and provided with smaller openings coming directly under the slats or under the imperforate portion of the upper false bottom. Orifice dimensions and partition distances are so arranged that material passing through the slots between the slats of the upper diaphragm and lying on the lower in an angle-of-repose position does not extend quite to the perforations or openings in the lower. Assuming that the material tends to bank up at an angle of about 45° and that a slatted upper partition is used, the two partitions should be considerably nearer each other than one-half the breadth of the slats. Very advantageously, they may be spaced apart about a quarter the width of the slats.

Referring now to the accompanying drawings, the same show a purifier box or vessel, 1, having the ordinary cover 2, depending into the sealing device 3, and having also a gas inlet 4 and outlet 5. 6 indicates a body of purifying material. Above the bottom 7 of the box is a false bottom 8, provided with perforations or openings 9, and above this again is another false bottom formed by a series of slats 10. Each perforation is located beneath the middle of the slat next above, and the slats are such a distance above the lowermost false bottom (8) that the pulverulent material falling between them and banking up in the angle-of-repose hillocks 11 underneath the slats cannot quite reach the perforations or openings. In this manner of operation, it is obvious that wide areas of the pulverulent material are exposed to the flow of the incoming gas, the total surface area of the hillocks in a box of the type shown being very great and all available for gas penetration. Advantageously, the total cross-area of the perforations or openings 9 is made about the same as that of the gas inlet 4, or somewhat larger, the excess in size, however, being no more than will compensate for the friction in such perforations. By so doing, the flow of gas will distribute itself evenly through all the perforations, not tending to take a preferential flow through any.

Using a purifier box of the character described with pulverulent materials, the usual admixture of sawdust with such materials may be much reduced or done away with, with a saving of valuable purifier room and avoidance of the detrimental influence of the sawdust in revivification and elsewhere.

What I claim is:—

1. A purifier box for holding pulverulent purifying material having a substantially horizontal bottom provided with relatively narrow substantially vertical gas ports and also having relatively wide shielding elements above such narrow ports and so spaced away therefrom vertically that pulverulent material falling therearound and assuming an angle of repose on said bottom while forming substantial hillocks shall not reach said ports.

2. A purifier box for holding pulverulent purifying material having a bottom provided with substantially vertical, relatively narrow gas ports; said box being provided with relatively wide shielding elements structurally separate from said bottom, located above the several gas ports and so spaced away therefrom that pulverulent material falling around said shielding elements and assuming an angle-of-repose upon said bottom while forming substantial hillocks thereon shall not reach the openings of said ports.

3. A purifier box for holding pulverulent purifying material provided with a false bottom having relatively small openings therein and a second false bottom having relatively large openings therein, located above the first bottom, the two sets of openings being relatively staggered and the distance between the two bottoms and the diameters of the openings of the two sets being so adjusted that pulverulent material falling through the upper, large openings while forming substantial hillocks on the lower bottom shall have an angle of repose thereon preventing its reaching the margins of the lower, narrower openings.

4. A purifier box for holding pulverulent material provided with an outlet for gas drawing from the upper portion of the box, a gas inlet communicating with the lower portion, a material-supporting false bottom above the inlet provided with relatively wide openings, and a second false bottom between the first and the inlet provided with relatively narrow openings staggered with respect to the first openings, said false bottoms being relatively so spaced apart as to cause the second openings to be beyond the angle of repose assumed by material freely falling through the first openings while allowing substantial hillocks of such material to form on the said second bottom.

5. A purifier box for holding pulverulent purifying material provided with gas outlets and inlets and also provided with a double false bottom, one such bottom consisting of a series of slats and the other of an orificed partition located below the slat bottom, said slats being wider than the orifices of the partition and located above the same, the width of the several slats and the vertical distance apart of the two bottoms being so related that pulverulent material falling between the slats shall form substantial hillocks on the orificed partition in assuming an angle of repose thereon without reaching the margins of the orifices.

6. A purifier box for holding pulverulent material provided with gas outlets and inlets and also provided with a double false bottom, the upper bottom having relatively wide openings and the lower relatively narrow openings, said latter openings being set beyond the angle of repose of material falling through the former openings.

7. A purifier box for holding pulverulent material provided with gas outlets and inlets and also provided with a double false bottom, the upper bottom having relatively wide perforations and the lower relatively narrow perforations, said latter openings being set beyond the angle of repose of material falling through the former openings and being so proportioned as to have a total sectional area equivalent to that of the gas outlets and inlets.

8. A purifier box for holding pulverulent material provided with gas outlets and inlets and also provided with a double false bottom, the upper consisting of a series of slats and the lower of a perforated partition having its perforations set midway the width of the slats above, the spaces between the slats and the distances between the bottoms being so relatively related that material falling between the slats may accumulate on the perforated partition in substantial hillocks without reaching the perforations.

9. A purifier box for holding pulverulent material provided with gas outlets and inlets and also provided with a double false bottom, the upper consisting of a series of slats and the lower of a perforated partition having its perforations set midway the width of the slat above, the two bottoms being spaced apart less than half the width of a slat but sufficiently far apart to permit the formation of substantial hillocks of material on the perforated partition.

In testimony whereof I affix my signature, in the presence of two witnesses.

HENRY L. DOHERTY.

Witnesses:
   ROGER H. LYON,
   K. P. McELROY.